Sept. 19, 1972  B. GROLMAN  3,692,604
METHOD OF MAKING NEAR-POINT CARDS FOR BINOCULAR REFRACTION
Original Filed June 30, 1969  2 Sheets-Sheet 1

INVENTOR.
BERNARD GROLMAN

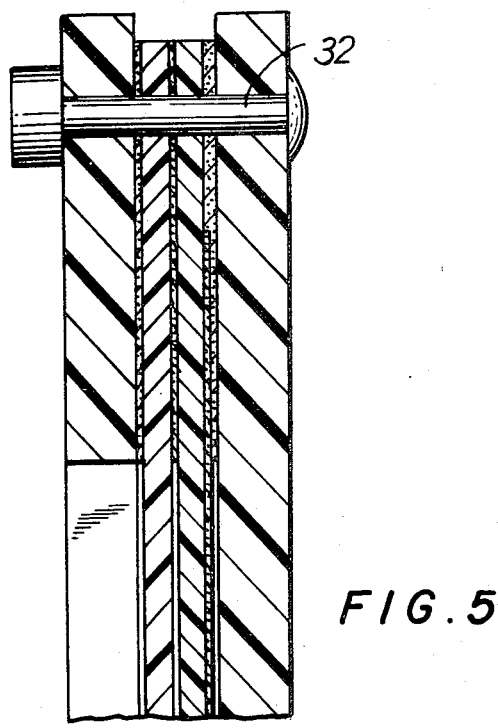
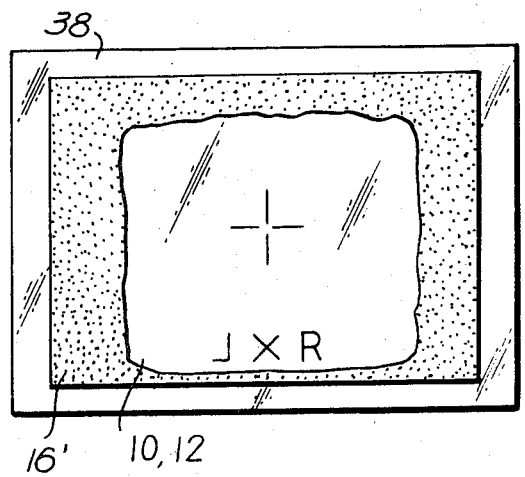
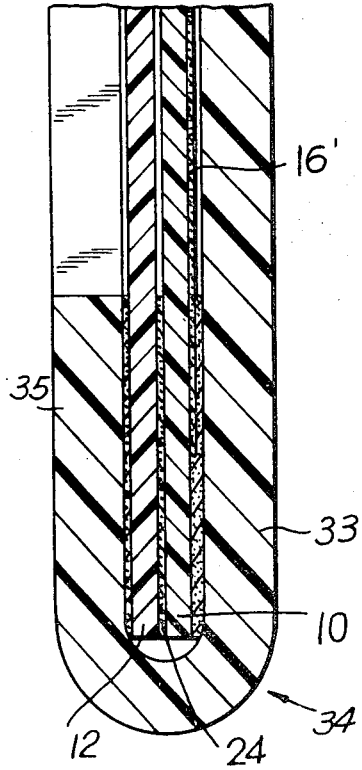
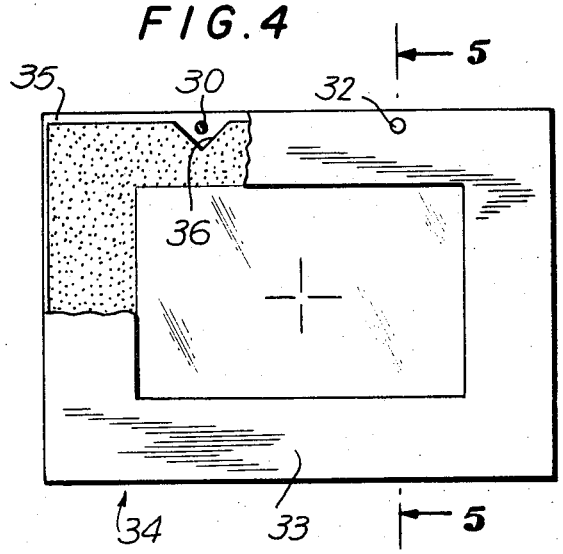
FIG. 3
FIG. 4
FIG. 5
INVENTOR.
BERNARD GROLMAN

3,692,604
METHOD OF MAKING NEAR-POINT CARDS FOR BINOCULAR REFRACTION

Bernard Grolman, Worcester, Mass., assignor to American Optical Corporation, Southbridge, Mass.
Original application June 30, 1969, Ser. No. 837,631, now Patent No. 3,572,911. Divided and this application Oct. 12, 1970, Ser. No. 80,245
Int. Cl. B32b 31/04, 31/14
U.S. Cl. 156—108                                         4 Claims

ABSTRACT OF THE DISCLOSURE

Near-point cards for binocular refraction and a lamination process for producing them are described wherein the product comprises a film having thereon a reproduction of the target for one eye with its image side upward cemented to a film having thereon a reproduction of the target for the other eye with its image side downward. The back of the film for the one eye is silvered and the two films are provided with a single frame which is riveted to center the targets. The process includes the steps of aligning the films, laminating them, re-aligning if necessary, spraying the back of the bottom film, and mounting the laminated films in a frame.

---

This is a division of application Ser. No. 837,631 filed June 30, 1969 now U.S. Pat. 3,572,911.

FIELD OF THE INVENTION

The invention relates primarily to near-point targets and more particularly to a card which is useful in testing binocular and monocular visual acuity.

PRIOR ART

An historical survey of binocular refraction techniques reveals that many procedures have been proposed which involve the fogging or blurring of one or both eyes, so that macular but not peripheral vision is suppressed. The peripheral vision remaining serves as a strong stimulus to the maintenance of binocular vision. For instance, suggestions have been made that the eye not under test be fogged with a plus two diopter sphere. Another suggestion is to employ a plus .75 diopter sphere before the eye not under test and further suggestions have been made for the use of neutral density filters in order to achieve a macular suppression while still retaining peripheral fusion stimuli.

The use of polarized light provides the clinician with the opportunity to present test target material to each eye separately without the need of a septum or the like. There are several commercially available binocular refraction devices which exploit this advantage. Essentially they all fall into one of two categories of polarizing mechanisms:

Firstly, the most widely used technique utilizes an overlay of polarizing sheet material on a photographic transparency. Each of a pair of test target transparencies, side by side, may be covered by a piece of polarizer material with axes oriented at right angles to each other. Wearing analyzers, the patient views the right field with the right eye and the left field with the left eye. The peripheral portions of the photographic transparency and the room provide peripheral fusional stimuli, promoting binocularity. This approach proves to be inadequate in that low visibility or low contrast targets are the consequence of an attenuation of target background illumination by two pieces of polarizer material—overlay and analyzer. Furthermore, each eye views the contralateral target field as totally black, due to the crossed axes of analyzer and background polarizer. Also, test target design is essentially limited to monocular fields which are separate—displaced one from the other either vertically or horizontally. Each of these factors encourage binocular disassociation and thereby limit the scope of investigation.

Secondly, another technique utilizes target symbols cut from polarizing materials. It might appear that each of two laterally disposed targets, super-imposed on a bright background, may be presented to only one eye. However, one must recall that a polarizing film, in essence, is composed of both a density filter which absorbs light in all meridians and a polarizing or additional light attenuation property in one meridian. If these targets are placed upon a clear, illuminated background, and viewed through appropriately oriented analyzers, each eye will readily see the density filter component of the target in the contralateral target field. In order to restrict viewing by each eye to homolateral target fields, the target cutouts must be inserted into a neutral density background, thereby effecting continuity of the target's neutral density component in the background. Target visibility is therefore low and only relatively gross symbols may be used.

SUMMARY OF THE INVENTION

Accordingly, a primary object of the present invention is to provide a target, and a process for making it, which is useful for binocular refraction which prevents binocular disassociation.

A further object is to provide a target, and a process for making it, which promotes high target visibility to enable the use of relatively small symbols.

A technique according to the present invention successfully overcomes the inadequacies of the previously disclosed instrumentation in the two techniques above and accomplishes the objects above. It more closely simulates normal binocular environment. Polarized or vectographic symbols and characters are formed by a high resolution printing process which involves the deposition of a dichroic dye on a stretched polyvinyl alcohol film. The stretching causes the straightening of the long chains of gross PVA molecules in a single direction which, in turn, provides for a similar unidirectional orientation of the dichroic dye crystals. Since a dichroic crystal transmits light along one axis or plane and absorbs light at right angles thereto, a symbol so printed will appear through analyzers as densely opaque to one eye while the other eye views an even, bright, unpatterned background in that same area. The analyzers may be rotated out of optimum alignment as much as 20° before undesired ghost images appear to each eye.

When a pair of vectographic symbols (see "Modern Stereo Techniques" Photographic Science and Technique, Series 2, vol. 1, pp. 84–87, August 1954 by Joseph Mahler) with axes of polarization at 90° to each other are physically superimposed, each may function independently without optical interference from the other. Thus, when the symbol or its projected image is viewed through appropriately oriented analyzers, each image can be made visible to one eye and invisible to the other. Further, such a technique also permits the simultaneous presentation of portions of the test target field to both eyes in order to effect a level of binocular involvement as determined by the test's objectives. Vectographic symbols can be viewed on a near-point card or alternatively, projected by a standard ophthalmic projector without modification on an illuminized non-depolarizing screen. The slide may be employed effectively in either dimly or brightly illuminated environments.

SUMMARY OF THE INVENTION

A near-point vectographic card for use in binocular refraction mounted in a frame comprising a laminated package including a film of a target for one eye, image side up and opaqued on the reversed side, and a film of a mirror-reversed target for the other eye, image side down to appear properly oriented to the refraction patient, said targets being polarized and providing monocular as well as binocular stimuli. The laminated package is in a frame. A method for manufacturing said card includes the steps of disposing a film of a target for one eye, image side up onto a glass plate, the bottom of which plate is opaque, aligning therewith a film of a target for the other eye, image side down, providing epoxy between said films to form a laminated package, drying said laminated package by providing a glass plate cover thereto, removing said glass plates, opaquing the back surface of said lamination, and framing said lamination with the unopaqued surface thereof exposed through the window of said frame.

Other features and embodiments of the present invention and a process for its manufacture are apparent in the following detailed description.

BRIEF DESCRIPTION OF DRAWINGS

FIG. 3 is a pictorial, top, partially cut-away view representation of the near-point card after the fifth step of its process of manufacture;

FIG. 4 is a pictorial, top, partially cut-away view representation of the near-point card product; and FIG. 5 is a sectional side view representation, partially cut away of the near-point card product.

DESCRIPTION OF A PREFERRED EMBODIMENT

Figure 1:
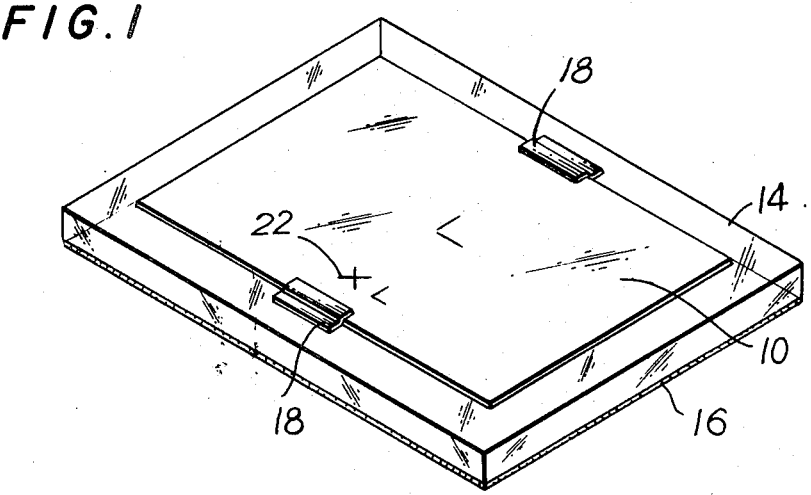
FIG. 1 is a pictorial representation of the near-point card according to the present invention after the first step of its process of manufacture.

Production of a near-point vectographic card useful in binocular refraction according to the present invention involves first the preparation of a negative including placing a master negative in contact with a high contrast film which is reversible (makes negatives directly without going through the positive stage). This is done so that the negative and the film are emulsion-to-emulsion in a printing frame. The master negative referred to is one in which the right eye target, for instance, has been mirror-reversed (reversal depicted by backward R in FIG. 2). Thereafter, the film assembly is exposed for three seconds with a 650 watt, 3200° Kelvin, 180 volt, quartz iodide lamp at a distance of approximately three feet. Then the exposed film is developed for three minutes (plus or minus ten seconds) in liquid developer. The film is rinsed in water and fixed for five minutes (plus or minus one minute) in rapid fixer with a hardener mixed in. The fixed film is washed in running water for approximately fifteen minutes and then hung for air drying.

The vectographic film (.010 acetate-based stretched polyvinyl alcohol film on both sides of the base) is pre-cut. Stock sheets, size 18" by 50", are carefully inspected to detect streaks, scratches, pits and discoloration and then cut into 6" by 9" pieces with the 9" edges as the top and bottom and the 6" edges as the sides. To do the cutting, the direction of polarization must be known and secondly, the direction desired must be known. To determine these directions, one must determine whether or not one eye image is mirror-reversed. If it is, the negative is correctly oriented.

At this point, certain facts about polarization and how that polarization affects the right and left eye images should be made clear. If film is polarized on both sides with the axis of polarization about 45° to the horizontal with one side having an axis which is 90° to the axis of the opposing side, when the film is reversed the axis of polarization will not change on the face side. If the film is rotated 180° the axis will still not change on the face side. The axis of polarization can only be changed on the face side by rotating 90°. By way of further clarification, if two images are printed on one piece of film, side by side, but one on one side of the film and the other on the other side, when you look at this with polarizing analyzers one eye will see one image and the opposite eye the other image. If the film is turned over, but not rotated, the image that was seen by the right eye will now be seen by the left eye and vice-versa. The important point is that an image on the side facing the viewer is always seen by the same eye. This fact can change only by rotation of 90°. Because of this capability to change polarization by rotation, all cutting and printing should be kept parallel to the edge of the original sheet. If this is not done, a loss in polarization will result. A maximum tolerance of 5° is permissible.

Right and left eye targets are printed on one negative, one above the other, making sure that an equal margin is left at the tops. The axis of the negative's target, horizontal when in registry, must be placed parallel to the top edge. The negatives are placed in a pre-wet solution with the emulsion side up and left two minutes minimum and eighteen hours maximum. The pre-wet solution is 400 cc. water plus 4 cc. acid stock solution (which is made up of 100 parts water to 1 part sulfuric acid).

The negative for one eye only is placed in a printing bath for one minute plus or minus five seconds with a new printing bath being used for each target. The printing bath is 250 cc. water plus 9 cc. of a stock solution comprising 1000 cc. water plus 500 grams potassium iodide plus 100 grams iodine. In addition, 2 cc. acid stock solution comprising 100 parts water to one part sulfuric acid is added to the printing bath.

Using apparatus such as a standard clipboard, a piece of blotter paper is placed on the board to absorb the excess solution. A piece of Plexiglas, ¾" by ¾" or another back-stopping device is placed behind the clip running the full width of the board. This insures correct alignment. The negative is removed from the printing bath and placed on the blotting paper with the emulsion side up and the top edge under the clip and against the back stop. The vectographic film is placed such that the top edge is aligned under the clamp and only this edge makes contact with the negative. The film is then rolled to the negative. The film is removed from the board and placed in a fixing bath for one minute plus or minus 15 seconds. Keeping the film submerged, it is removed from the fixing bath and wiped dry and then placed in a drying rack for at least 12 hours. The fixing bath comprises 1000 cc. water plus 50 grams boric acid plus 5 grams borax plus 7 grams potassium iodide.

Figure 2:
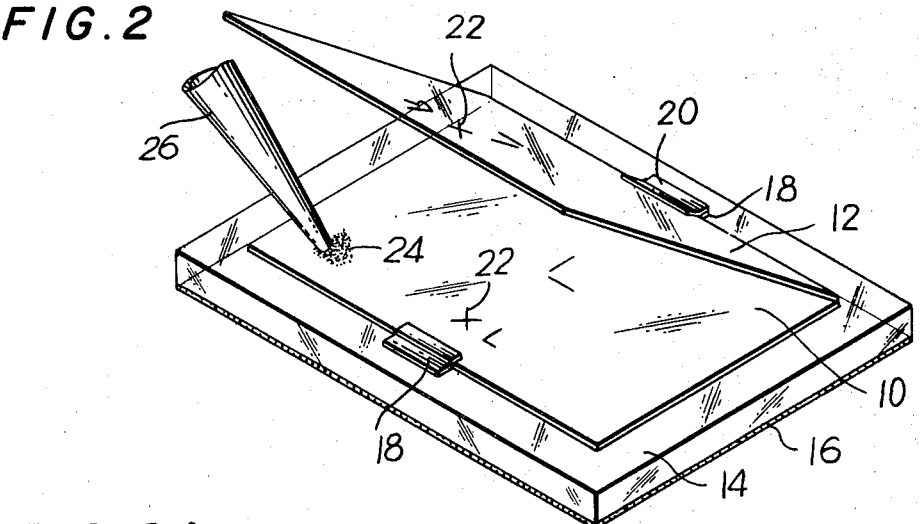
FIG. 2 is a pictorial representation of the near-point card after the second and during the third step of its process of manufacture.
Figure 2A:
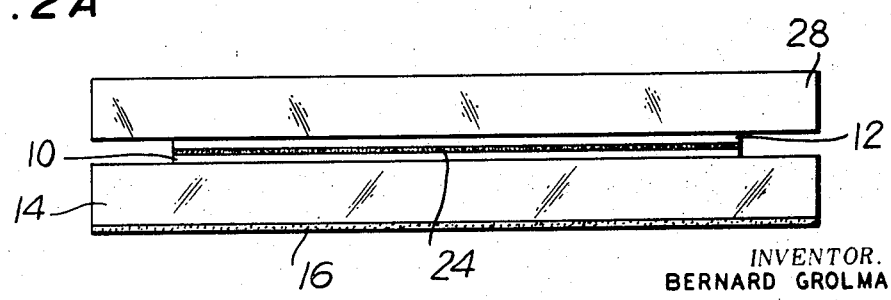
FIG. 2A is a pictorial side view representation of the near-point card after an intermediate fourth step of its process of manufacture.

Referring to FIGS. 1–5, lamination of the films of the target is accomplished by orienting the left and right eye targets 10, 12 using polarizing analyzers and then mirror-reversing one of the targets (for instance, the right eye target). FIG. 1 shows the left eye target 10 placed printed side up on a 9" by 12" glass plate 14 which is opaqued (by silvering 16 or otherwise) on its underside. Tape with two adhesive surfaces 18 is placed between the glass and the left eye target film 10. The reversed or right eye film 12 is then placed as shown in FIG. 2, printed side down (to accomplish the reversal) with a piece of masking tape 20 along the top edge to cause it to adhere to the glass 14. Using a 7-power magnifier, the targets should be registered with each other by use of the "X" 22 on the films. The top film 12 should then be lifted using the piece of masking tape 20 as a hinge and a bead of epoxy 24 run across the bottom starting about one inch in from either side by an appropriate dispenser 26. The epoxy 24 should be centrifuged at 3000 r.p.m. for about 10 minutes and about 2.5 grams of epoxy used for each lamination. The two films 10, 12, should be rolled together and excess epoxy wiped out. If necessary, the two target films should be readjusted for proper registry before the epoxy drys. A second piece of plate glass 28 is placed over the top of the laminated target films during the drying time as illustrated in FIG. 2A.

In order to accomplish final cutting of the lamination a template is made of transparent rigid plastic. The outer edges are 7/16" smaller than the vectograph frame to prevent protrusion of the edges after final assembly. Two holes are punched in the top edge of the template to accommodate the frame hanger pins 30, 32. With a fine point pen the center opening of the frame 34 is indicated on the template. The entire template is then lined off, the lines being 1/8" apart running both horizontally and vertically. The lines are numbered along the outer edge and with this template any target can be centered. It will also be self-aligning when placed in the frame 34. The top glass 28 of the laminated drying package (FIG. 2A) is removed and using the template, the targets are centered with the frame 34 so that the hangar pinholes 36 can be made at the top of the film 10, 12. The holes 36 are marked, and the film cut and punched. Using masking tape, the laminated films are placed face down on a piece of cardboard 38 and masking tape used to seal the edges. As shown in FIG. 3 the back surface of the laminated films is then sprayed with silver paint 16' using four or five coats and allowing each coat to dry before spraying the next. Vectographic lamination package is then removed and it may be seen at this point that no light shows through. The frame 34, comprising a solid back 33 surface and a windowed front surface 35 is held open about 90°. A single jig made by nailing two pieces of wood together to form a 90° angle is provided so that the frame can be clamped to the inside of the jig. Double sticky tape is placed on all edges of the inside of the frame back and the vectographic lamination placed in the frame 34 at about 45° to avoil contact before sealing. The lamination is then sealed firmly in the fold of the frame and side-to-side alignment can be done by eye as the clearance is very slight. The lamination is then pressed against the tape to hold it in place. The frame 34 is removed from the jig, closed, and pressed firmly to seal (FIGS. 4 and 5) so that hangar pin rivets 30, 32 can be set by use of an appropriate tool.

The product of the present invention, shown in FIGS. 4 and 5, includes a frame backing member 33 and a frame window member 35 encasing a laminated package having target films 10 and 12 cemented by epoxy 24 and the like. The laminated package is backed by silver 16 and rivets 30 and 32 hold the assembled product together.

The card is displayed to a refraction patient who uses appropriately oriented analyzers to view it to thereby have his binocular refraction characteristics measured.

What is claimed is:

1. A process for producing near-point cards useful in binocular refraction comprising the steps of:
   (a) affixing temporarily a first film having a light-polarizing image on one side thereof, image side up, to a first opaqued glass plate,
   (b) affixing temporarily a second film having a second mirror-reversed light-polarizing image on one side thereof, image side down, to said first film and said glass plate, such that said second film is hingedly attached to one of said first film and said glass plate,
   (c) applying epoxy to the top of the first film and the bottom of the second film,
   (d) aligning the images of said films,
   (e) drying said epoxy,
   (f) removing said epoxied films from said glass plate,
   (g) and opaquing the bottof of said first film.

2. The invention according to claim 1 wherein said process comprises the further steps of encasing the epoxied films in a frame.

3. The invention according to claim 1 wherein said process comprises the further step of covering said films with a second glass plate during step (e).

4. The invention according to claim 2 wherein said process comprises the further step of affixing said epoxied films to said frame.

References Cited

UNITED STATES PATENTS

| | | | |
|---|---|---|---|
| 2,280,297 | 4/1942 | Neumueller et al. | 351—39 |
| 2,281,101 | 4/1942 | Land | 350—153 |
| 2,346,774 | 4/1944 | Mahler | 350—153 |
| 2,440,125 | 4/1948 | Sterck | 350—153 |
| 3,241,960 | 3/1966 | Mahler | 350—153 X |

ROBERT F. BURNETT, Primary Examiner

D. J. FRITSCH, Assistant Examiner

U.S. Cl. X.R.

156—152, 247, 249, 280